(12) United States Patent
Nakashita (10) Patent No.: US 11,194,481 B2
(45) Date of Patent: Dec. 7, 2021

(54) INFORMATION PROCESSING APPARATUS AND METHOD FOR CONTROLLING INFORMATION PROCESSING APPARATUS

(71) Applicant: CANON KABUSHIKI KAISHA, Tokyo (JP)

(72) Inventor: Tsunahito Nakashita, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/721,680

(22) Filed: Dec. 19, 2019

(65) Prior Publication Data

US 2020/0210074 A1 Jul. 2, 2020

(30) Foreign Application Priority Data

Dec. 28, 2018 (JP) .............................. JP2018-247848

(51) Int. Cl.
*G06F 3/06* (2006.01)
*G06F 11/10* (2006.01)

(52) U.S. Cl.
CPC ............ *G06F 3/0619* (2013.01); *G06F 3/064* (2013.01); *G06F 3/0616* (2013.01); *G06F 3/0652* (2013.01); *G06F 3/0653* (2013.01); *G06F 3/0659* (2013.01); *G06F 3/0688* (2013.01); *G06F 11/1092* (2013.01)

(58) Field of Classification Search
CPC ...... G06F 3/0614; G06F 3/065; G06F 3/0688; G06F 11/1469
See application file for complete search history.

(56) References Cited

U.S. PATENT DOCUMENTS

| 2004/0088505 | A1* | 5/2004 | Watanabe | ............... | G06F 3/067 |
| | | | | | 711/161 |
| 2012/0254508 | A1* | 10/2012 | Walls | .................... | G06F 3/0688 |
| | | | | | 711/103 |
| 2020/0241970 | A1* | 7/2020 | Shang | ................. | G06F 11/1458 |

FOREIGN PATENT DOCUMENTS

| JP | 2006-252451 A | 9/2006 |
| JP | 2012-079100 A | 4/2012 |

* cited by examiner

*Primary Examiner* — Edward J Dudek, Jr.
(74) *Attorney, Agent, or Firm* — Canon U.S.A., Inc. I.P. Division (57) ABSTRACT

An information processing apparatus includes a master storage that is a nonvolatile semiconductor memory, a slave storage that is a nonvolatile semiconductor memory, a determination unit configured to determine a free storage area of the master storage, an instruction unit configured to provide an instruction to write dummy data into the area determined by the determination unit, and a control unit configured to perform one of rebuild control to rebuild the slave storage on a basis of the master storage and mirroring control on the master storage and the slave storage. The instruction unit provides an instruction to write dummy data into the free area before the control unit performs rebuild control.

10 Claims, 10 Drawing Sheets

INFORMATION PROCESSING APPARATUS AND METHOD FOR CONTROLLING INFORMATION PROCESSING APPARATUS

BACKGROUND

Field of the Disclosure

The present disclosure relates to an information processing apparatus including a plurality of nonvolatile semiconductor memories and a method for controlling the information processing apparatus.

Description of the Related Art

A large-capacity storage device, such as a hard disk drive (HDD) or a solid state drive (SSD), has been mounted in an information processing apparatus so as to provide a storage function of storing an operation program and saving or editing image data.

In recent years, SSDs have rapidly gained widespread use owing to their increase in capacity and drop in price. SSDs are capable of higher random access speed than HDDs. SSDs are low-power, high shock resistant, light weight, and space-saving devices. In particular, SSDs do not require an initial operation at system startup, such as spin-up required for HDDs. In addition, SSDs have high speed data transfer rates. These features are very effective in reducing startup time and recovery time. For this reason, SSDs have been used as storage devices of image forming apparatuses.

SSDs have two types of major limit numbers, that is, the limit number of rewrites (P/E cycles) and the limited retention time of data. The limit number of rewrites depends on a flash memory mounted in the SSD, and the limit number continuously decreases with refinement of a flash memory manufacturing process.

As the number of rewrites in an SSD increases, the chance of disadvantages increases, such as a decrease in data retention time and a decrease in usable area. To prevent such disadvantages and extend the life of the storage device, a technique known as "wear leveling" is used. In wear leveling, a flash memory controller mounted in the SSD evenly distributes the number of P/E cycles to available write areas so that the P/E cycles of certain areas are not consumed.

The file system (hereinafter simply referred to as an "FS") of an SSD operating system (hereinafter referred to as an "OS") deletes unnecessary files (data) from the management information during the read/write processing performed on the storage. However, at this time, the file is deleted from only file management information. The actual file data stored in the storage area of the SSD is not deleted and, thus, remains in the storage area.

For this reason, to maintain the write performance, the SSD controller basically uses a free block for writing if there is a free block in a NAND flash memory mounted in the SSD. Accordingly, the number of free blocks decreases as the SSD is used. If the free blocks are completely consumed, the SSD controller needs to perform a garbage collection process when writing, and the write performance significantly decreases.

To solve such a problem, in recent years, the Trim command has been in widespread use. The Trim command is a command used to prevent performance degradation. The Trim command notifies an SSD of data that is no longer necessary in the OS management information so that all of the blocks including the unnecessary data in the SSD are subjected to garbage collection and delete processing in one go.

In addition, SSDs serve as storage devices that replace HDDs. For this reason, like HDDs, the use of SSDs in a RAID 1 mirroring configuration has been studied to improve the reliability of storage devices.

The mirroring configuration is a configuration in which the same data is written to two storage devices. According to such a configuration, even if one storage device malfunctions, the storage device can be replaced with a new one and, thereafter, the data can be recovered by using the other storage device (refer to Japanese Patent Laid-Open No. 2006-252451 and No. 2012-079100).

When the mirroring configuration is installed, the main controller is connected to each of the two storage devices via a mirroring control unit in an information processing apparatus. In this case, mirroring control is performed by the mirroring control unit. From the point of view of the main controller, only one storage device is connected to the information processing apparatus.

SUMMARY

According to one aspect of the present disclosure, an information processing apparatus includes a master storage that is a nonvolatile semiconductor memory, a slave storage that is a nonvolatile semiconductor memory, a determination unit configured to determine a free storage area of the master storage, an instruction unit configured to provide an instruction to write dummy data into the area determined by the determination unit, and a control unit configured to perform one of rebuild control to rebuild the slave storage on a basis of the master storage and mirroring control on the master storage and the slave storage. The instruction unit provides an instruction to write dummy data into the free area before the control unit performs rebuild control.

Further features of the present disclosure will become apparent from the following description of exemplary embodiments with reference to the attached drawings.

DESCRIPTION OF THE EMBODIMENTS

Exemplary embodiments of the present disclosure are described in detail below with reference to the accompanying drawings. It should be noted that the following exemplary embodiments are in no way intended to limit the disclosure defined by the attached claims. All of the combinations of the features described in the exemplary embodiments are not necessarily essential to the disclosure. Also, note that in the following exemplary embodiments, an image processing apparatus is used as an example of the information processing apparatus.

First Exemplary Embodiment

Figure 1:
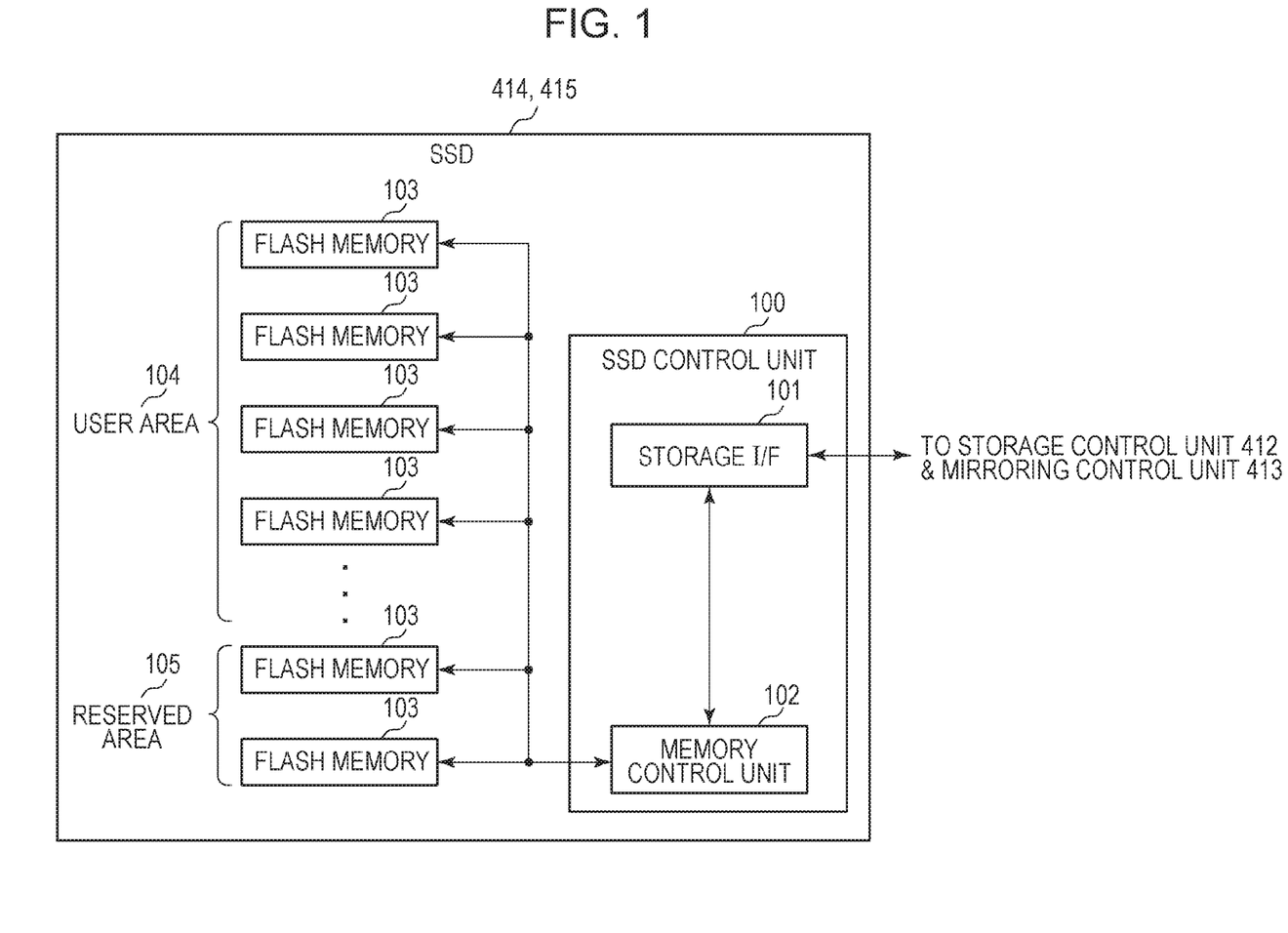
FIG. 1 is a block diagram illustrating the internal configuration of an SSD.

FIG. 1 is a block diagram illustrating the internal structure of SSDs used as the storage devices 414 and 415. According to the present embodiment, the configuration using the SSDs is illustrated. However, any nonvolatile semiconductor memory other than an SSD, such as an embedded multimedia card (EMMC), may be used.

The SSD includes an SSD control unit 100 and a plurality of flash memories 103. The SSD control unit 100 includes a storage interface (I/F) 101 and a memory control unit 102. The storage I/F 101 is connected to a storage control unit 412 or a mirroring control unit (described below). That is, the storage I/F 101 is a module for communicating with the storage control unit 412 or the mirroring control unit. In the example illustrated in FIG. 1, a serial AT attachment (ATA) interface (hereinafter referred to as an "SATA interface") is used as the storage I/F 101.

The memory control unit 102 controls the plurality of flash memories 103 as a single large storage device. Since wear leveling is performed by the memory control unit 102, the logical address and the corresponding physical address of each of the flash memories 103 change dynamically.

In the storage device composed of a plurality of flash memories 103, a storage area managed from the outside of the SSD using a logical address is a user area 104, and a storage area managed by only the SSD control unit 100 is a reserved area 105.

However, since as described above, wear leveling is performed, physical addresses of the flash memory 103 allocated to the user area 104 and the reserved area 105 are not fixed and dynamically change.

The user area 104 is an area in which user programs including an OS and data are stored. FS management information is further stored in the user area 104. The FS management information mainly consists of information used to manage storage locations and the usage status of a file on the logical address space managed by the OS.

The reserved area 105 is a spare area used for storing management information of the SSD control unit 100 and performing wear leveling and garbage collection. The management information of the SSD mainly consists of logical address-physical address link information, the number of times of deleting each physical block, and the usage status of the physical block.

Figure 2:
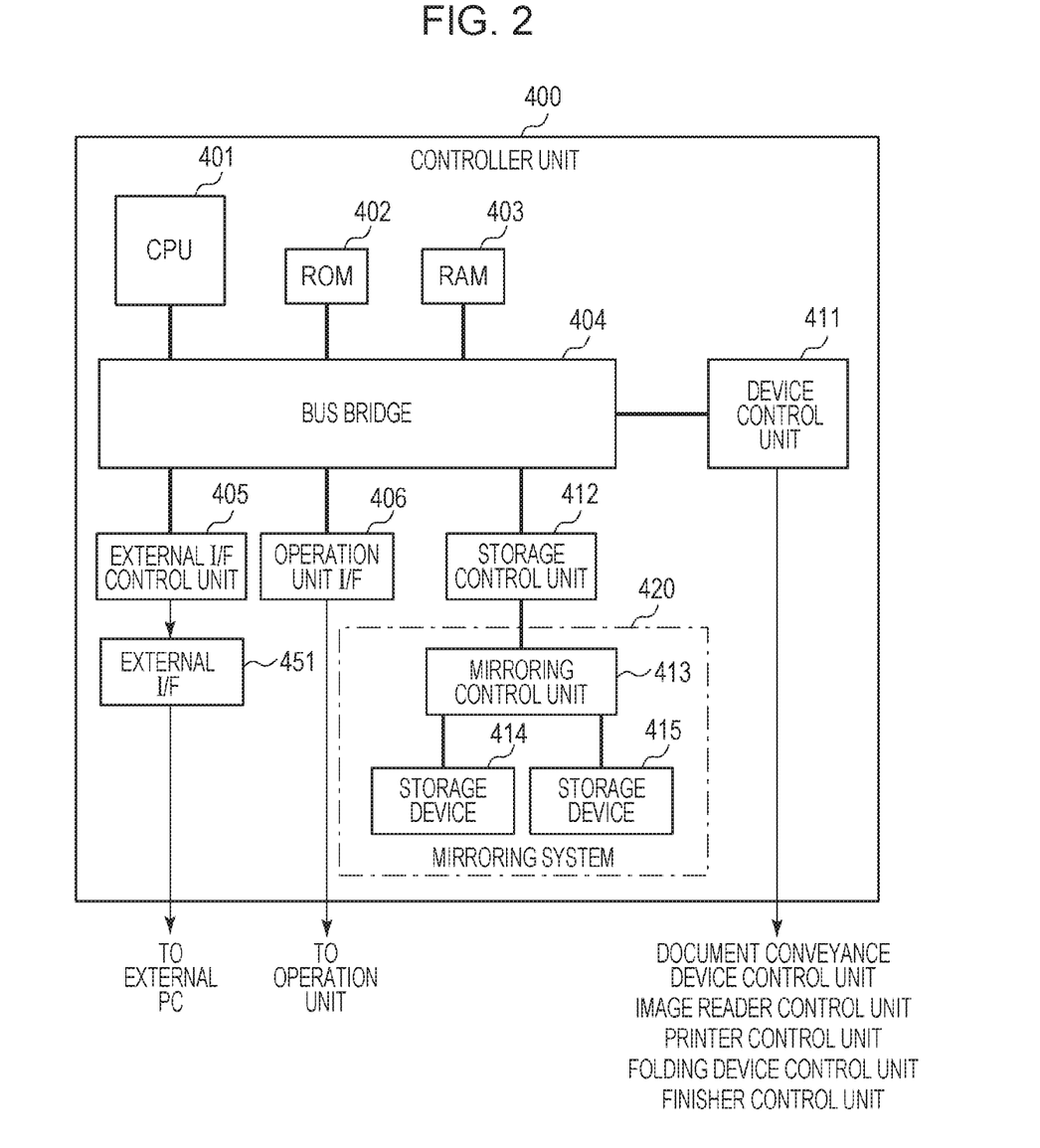
FIG. 2 is a block diagram of a controller unit.

FIG. 2 is a block diagram illustrating the controller unit 400 of the image forming apparatus having the storage devices 414 and 415, which are SSDs, incorporated thereinto.

The controller unit 400 illustrated in FIG. 2 communicates with a document conveyance control unit that controls a document conveyance device and an image reader control unit that controls an image reader on the basis of an instruction input from an operation unit or an external computer (neither is illustrated). Thus, the controller unit 400 acquires the image data of an input document. In addition, the controller unit 400 communicates with a printer control unit that controls the printer unit and prints the image data on a sheet. Furthermore, the controller unit 400 communicates with a folding device control unit that controls the folding device and a finisher control unit that controls a finisher and provides a desired output, such as stapling or punch holes, on the printed sheets.

An external I/F 451 is an interface connected to an external computer. For example, the external I/F 451 is connected to an external computer via an external bus, such as a network or a USB. Thereafter, the external I/F 451 converts print data received from the external computer into an image and outputs the image. In addition, the external I/F 451 transmits an image data stored in the storage device 415 (described below) to the external computer.

The controller unit 400 includes a central processing unit (CPU) 401 and is controlled by the OS. A bus bridge 404 is connected to the CPU 401. The CPU 401 has a bus bridge 404 connected thereto. The bus bridge 404 has, connected thereto, a read only memory (ROM) 402, a random access memory (RAM) 403, an external I/F control unit 405, an operation unit I/F 406, and the storage control unit 412. The CPU 401 reads an initial startup program from the ROM 402 via the bus bridge 404. In addition, the CPU 401 loads a program into the RAM 403, which is used as a temporary data storage area and a calculation work area for control.

The storage control unit 412 controls the storage device connected to the storage control unit 412 on the basis of an instruction received from the CPU 401. More specifically, the storage control unit 412 is a hardware module that performs read/write control of storage devices, such as HDDs and SSDs. The SATA interface is used for connection with the storage devices. Note that in FIG. 2, the storage control unit 412 considers the mirroring system 420 as a single storage device and performs control.

The mirroring system 420 has a configuration in which a storage device 414 and a storage device 415 are connected to a mirroring control unit 413. The mirroring control unit 413 is a hardware module that performs storage mirroring control. In FIG. 2, the mirroring control unit 413 has an independent configuration. However, the mirroring control unit 413 may be included in the storage control unit 412. In the configuration illustrated in FIG. 2, the mirroring control unit 413 is connected to the storage control unit 412 by using an SATA interface.

The storage devices 414 and 415 are used to store a main program including the OS of the CPU 401, image data acquired from the image reader or an external I/F 451, and an image edited using the operation unit. In addition, the storage devices 414 and 415 are used as the storage location of an application program. Furthermore, the storage devices 414 and 415 are used as storage locations of data for the application program and user preference data. The storage devices 414 and 415 are configured so as to be accessible by the CPU 401. The storage device 414 and the storage device 415 are SSDs, for example.

The storage devices 414 and 415 are connected to the storage control unit 412 via the mirroring control unit 413. Since the storage devices 414 and 415 operate in a mirroring control configuration, the same data is written to the same logical addresses. Therefore, the data written into the storage device 414 is exactly the same as the data written into the storage device 415.

The external I/F control unit 405 controls the network and the USB interface. The operation unit I/F 406 is connected to the operation unit.

The device control unit 411 is connected to a document conveyance device control unit, an image reader control unit, a printer control unit, a folding device control unit, and a finisher control unit (none are illustrated) and performs control of these units.

Rebuild control is described with reference to an example illustrated in FIGS. 3A to 3D and FIG. 4. In the example, the storage device 415 is replaced with a new one, or the storage device 415 is added to a configuration including only the storage device 414. The reason for replacement is, for example, the occurrence of a failure of the storage device. In this example, the storage device 414 serves as a master device, and the storage device 415 serves as a slave. Similarly, even when the storage device 414 is replaced with a new one or the storage device 414 is added, the new device or the added device serves as a slave.

Figure 3A:
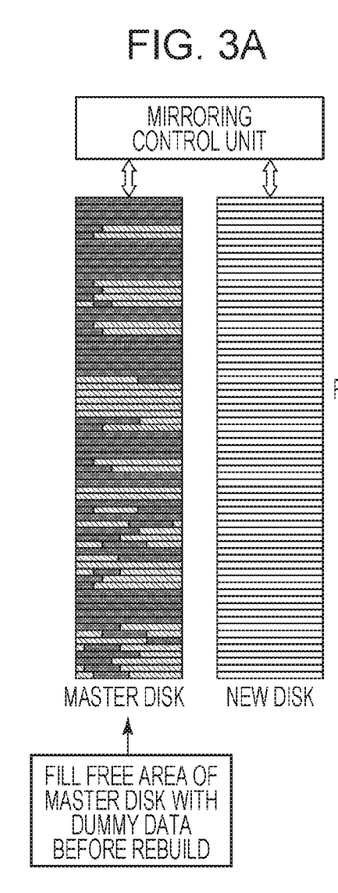
FIGS. 3A to 3D are schematic illustrations of state transition of storage devices.
Figure 3B:
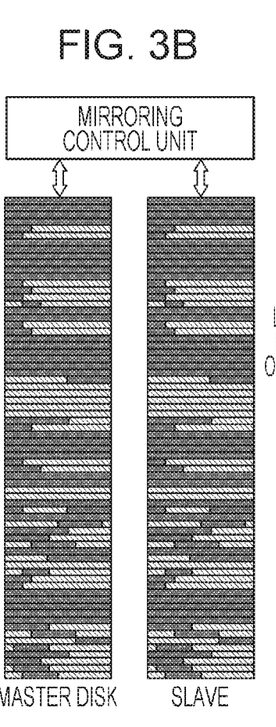
Figure 3C:
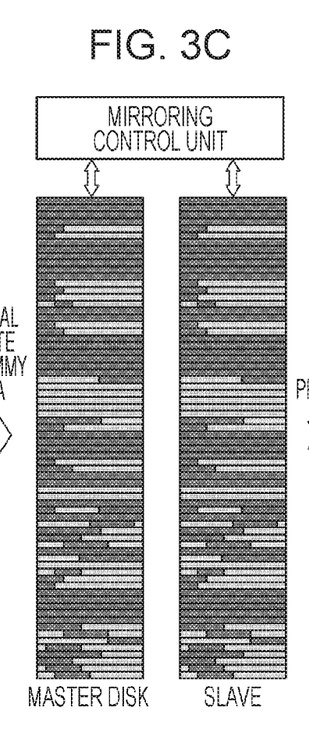
Figure 3D:
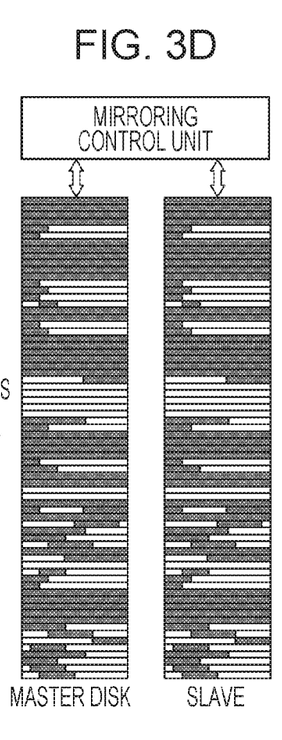
Figure 4:
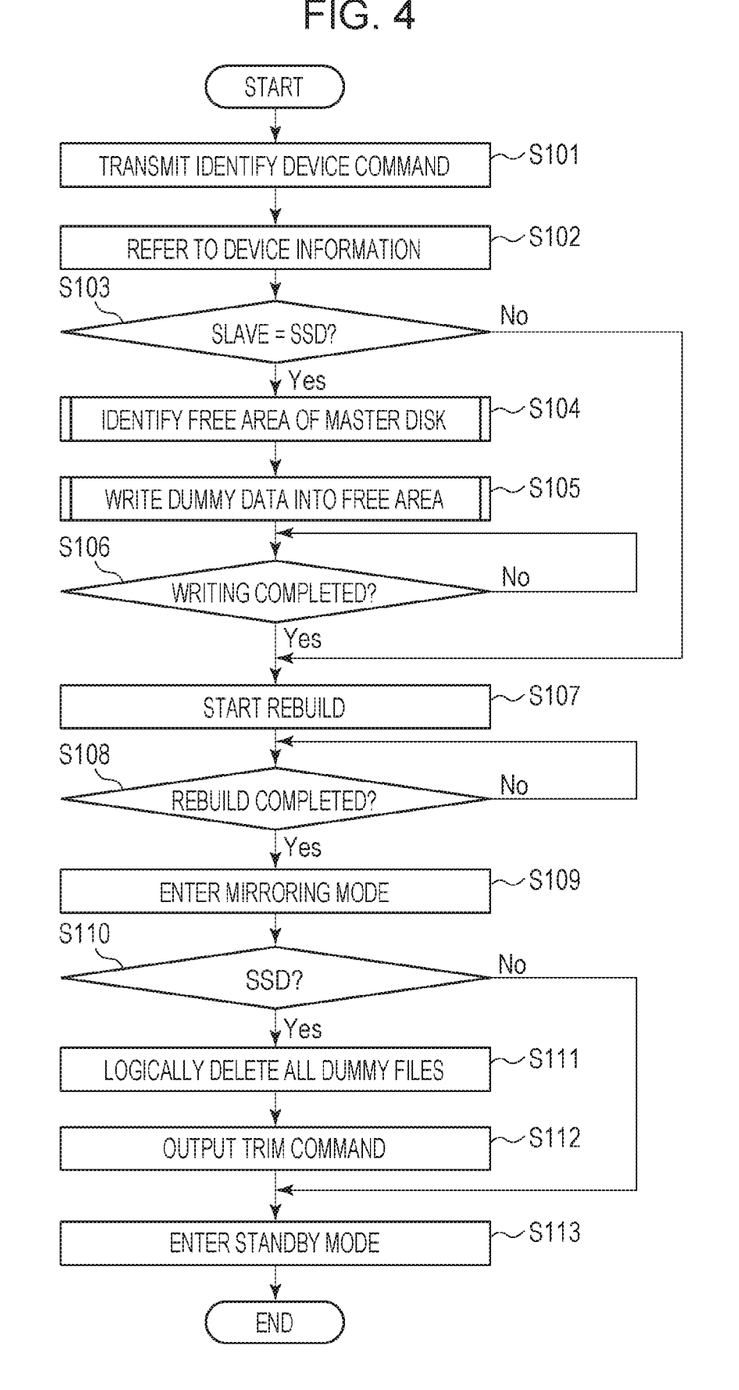
FIG. 4 is a flowchart illustrating storage device rebuild control.

FIGS. 3A to 3D are schematic illustrations of state transition of the storage devices, and FIG. 4 is a flowchart of storage device rebuild control.

In FIG. 4, when the controller unit 400 is powered on at the time of system startup, the CPU 401 checks the connection status of each of the devices in order to initialize the mirroring system 420. As used herein, the term "initialization" refers to confirmation of the state and initial settings at startup.

When checking the connection status of each of the devices, the CPU 401 starts the following process flow, in which confirmation of the connection of the storage device is started first.

In step S101, the CPU 401 ensures that the storage device 414 and the storage device 415 are connected thereto via the mirroring control unit 413. Thereafter, the CPU 401 transmits an Identify device command to each of the storage device 414 and the storage device 415 via the mirroring control unit 413. Upon receiving the identify device command, each of the storage device 414 and the storage device 415 sends back the device information to the CPU 401 via the mirroring control unit 413.

In step S102, the CPU 401 refers to the received device information and receives the device types of the storage device 414 and the storage device 415. For example, if the value of WORD 217 (Nominal Media Rotation Rate) in the received device information is "0001h", the CPU 401 determines that the storage device is an SSD.

In step S103, if the storage device 415 is not an SSD (for example, an HDD), rebuild is started in step S107. The rebuild in step S107 is described below.

However, if the storage device 415 is an SSD, the processing proceeds to step S104.

In step S104, the processing proceeds to the sequence of determining a free area of the storage device 414 serving as a rebuild master storage. The free area determination sequence is described in detail below with reference to FIG. 5.

Figure 5:
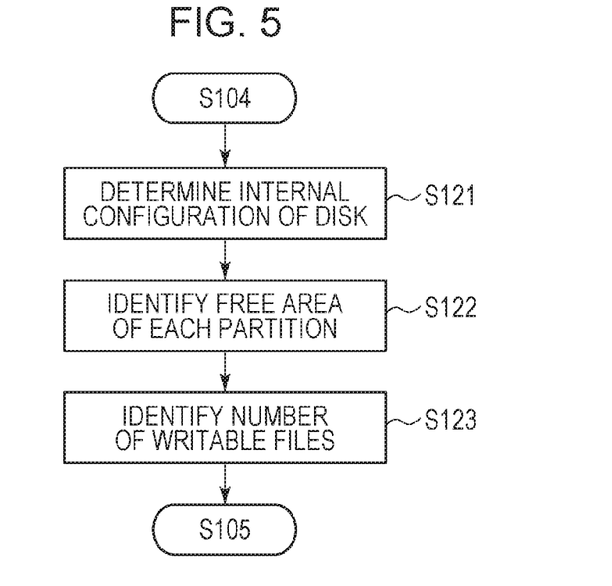
FIG. 5 is a flowchart illustrating the sequence of free area determination.

In step S121, the CPU 401 determines the internal configuration of the storage device 414. More specifically, the CPU 401 acquires the storage information about the storage device 414 and identifies the partition configuration of the storage device 414 and the FS being used.

In step S122, the CPU 401 identifies a free area in each of partitions of the storage device 414. For example, in the case of the Linux® OS, the capacity of the free area is calculated by using the free count in the super block included in the FS management information regarding each of the partitions. The super block stores file system management information. Examples of the stored information include the number of data blocks in the partition, the block size, and the number of free blocks.

In step S123, the CPU 401 determines the number of writable files in each partition. More specifically, in the case of the Linux OS, the FS Mode table is referenced, and the number of usable Modes is identified. After step S104 ends, the processing proceeds to step S105, where the dummy data file write sequence is performed.

Figure 6:
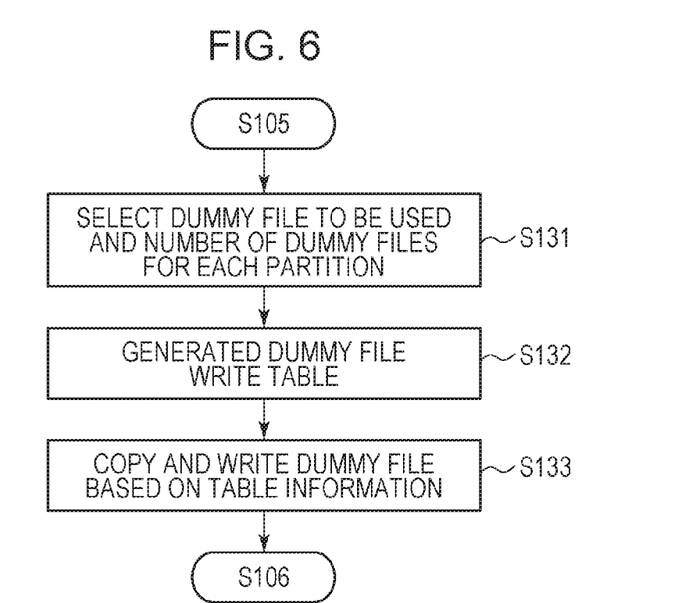
FIG. 6 is a flowchart illustrating the sequence of processes of writing a dummy data file.

The dummy data file write sequence in step S105 is performed according to the process flow illustrated in FIG. 6.

The dummy data file consists of "FF" (ALL "H") data (data padded with High bits), and a plurality of types of files having different sizes are available so as to match free spaces of a variety of capacities.

Any sizes of the plurality of types of dummy data files are allowed. According to the present exemplary embodiment, the minimum size is 4 kilobytes, which is the page size of widely used flash memories, and the maximum size is 64 megabytes. The storage location of the dummy data file may be any one of the ROM 402, RAM 403, storage device 414, and storage device 415.

In step S131, the CPU 401 selects the sizes of dummy data files to be used and the number of the dummy data files in accordance with the free area of each of the partitions. Basically, the CPU 401 selects, from among the available dummy data files, ones in the order of increasing file size, and the remainder is filled with a file of a small size.

This is because writing a small amount of data many times is inefficient from the viewpoint of the performance and, in addition, the number of writable files per partition is limited.

Accordingly, the file size and the number of files are set so that the number of files to be written does not exceed the number of writable files determined in step S123 for each partition.

In step S132, a dummy data file write table is generated. The dummy data file write table is used to manage the sizes and the number of the dummy data files to be used for each partition (the sizes and the number set in step S131).

In step S133, the CPU 401 writes the dummy data files to each partition in accordance with the dummy data file write table.

In step S106, the CPU 401 determines whether all of the dummy data files have been written. The state at this time is illustrated in FIG. 3A. As illustrated in FIG. 3A, all of the free areas of the storage device 414 serving as the master storage are filled with dummy data files.

In step S107, the mirroring control unit 413 starts rebuild on the storage device 415 from the storage device 414. At this time, the mirroring control unit 413 copies, to a new SSD (i.e., the storage device 415), an image copy of all the data in the area managed by the logical addresses in the storage device 414 serving as the master storage device.

In step S108, the CPU 401 determines whether the rebuild is completed. If the rebuild control is completed, the master storage and the slave storage have exactly the same state as illustrated in FIG. 3B. In step S109, the CPU 401 causes the mirroring control unit 413 to enter a mirroring control mode.

If in step S110, the CPU 401 determines that the storage device 415 is an SSD on the basis of the device information acquired in step S102, the CPU 401 logically deletes all of the dummy data files in step S111. As a result of this processing, as illustrated in FIG. 3C, the areas in which the dummy data files are stored in the master storage and the slave storage are changed to areas of unnecessary data defined in the management information by the OS.

In step S112, the CPU 401 transmits a Trim command to the SSD. Upon receiving the Trim command, the SSD performs a delete process of the data in the unnecessary areas defined in the management information of the OS. After the delete process is performed, the state of the master storage before rebuild can be completely reproduced on the slave storage, as illustrated in FIG. 3D.

According to the present exemplary embodiment, when both the storage devices 414 and 415 are SSDs, the Trim command is transmitted to both. However, when the storage device 414 serving as the master storage is an HDD, the Trim command is transmitted only to the storage device 415. After step S112 is completed, the processing proceeds to step S113.

In step S113, the storage device 414 and the storage device 415 enter a standby mode.

According to the configuration of the present exemplary embodiment, when rebuild control is performed on the basis of a master storage with a free area, all of the free areas are changed to used areas from the viewpoint of the SSD control unit of the slave storage. Thus, a decrease in performance can be prevented.

Second Exemplary Embodiment

The configuration of the present exemplary embodiment is described below with reference to FIGS. 7A to 7D and FIG. 12. According to the present exemplary embodiment, unlike the first exemplary embodiment, a continuous free area having a value greater than or equal to a predetermined value in the master storage is detected and is set as a rebuild non-target area. Thereafter, a dummy data file is written only to a rebuild target area and, thus, only the rebuild target area is rebuilt. Note that in the following description, the predetermined value is a predetermined capacity. However, the present disclosure is not limited thereto. Also note that the constituent elements of the first exemplary embodiment illustrated in FIGS. 1 and 2 are common to the second exemplary embodiment. Accordingly, description of the constituent elements of the present exemplary embodiment is not repeated.

Rebuild control performed when an old storage device is replaced with a storage device 415 is described below with reference to FIGS. 7A to 7D and FIG. 8.

Figure 7A:
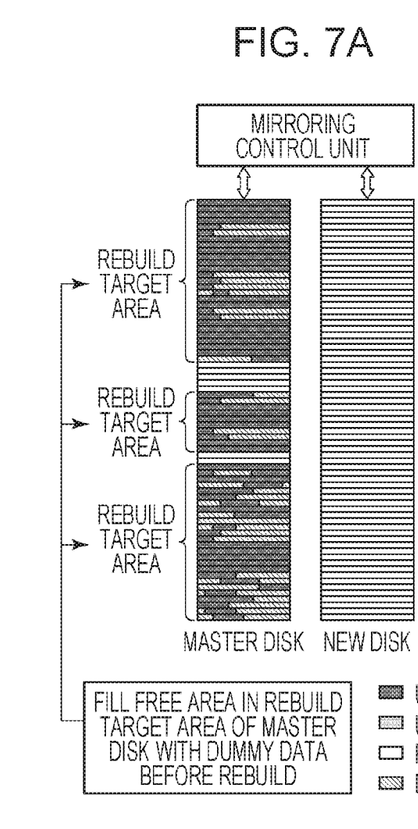
FIGS. 7A to 7D are schematic illustrations of state transition of storage devices.
Figure 7B:
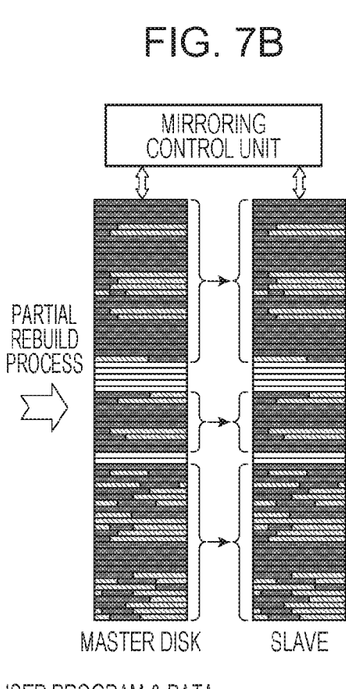
Figure 7C:
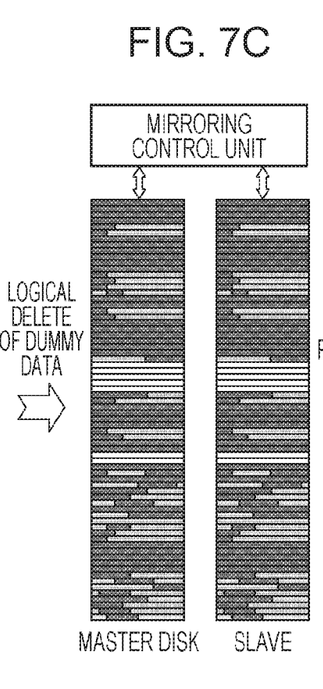
Figure 7D:
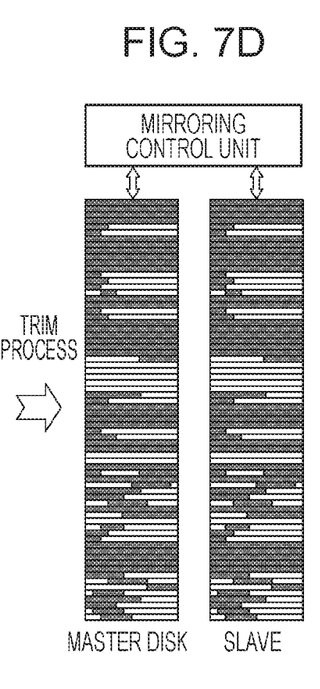
Figure 8:
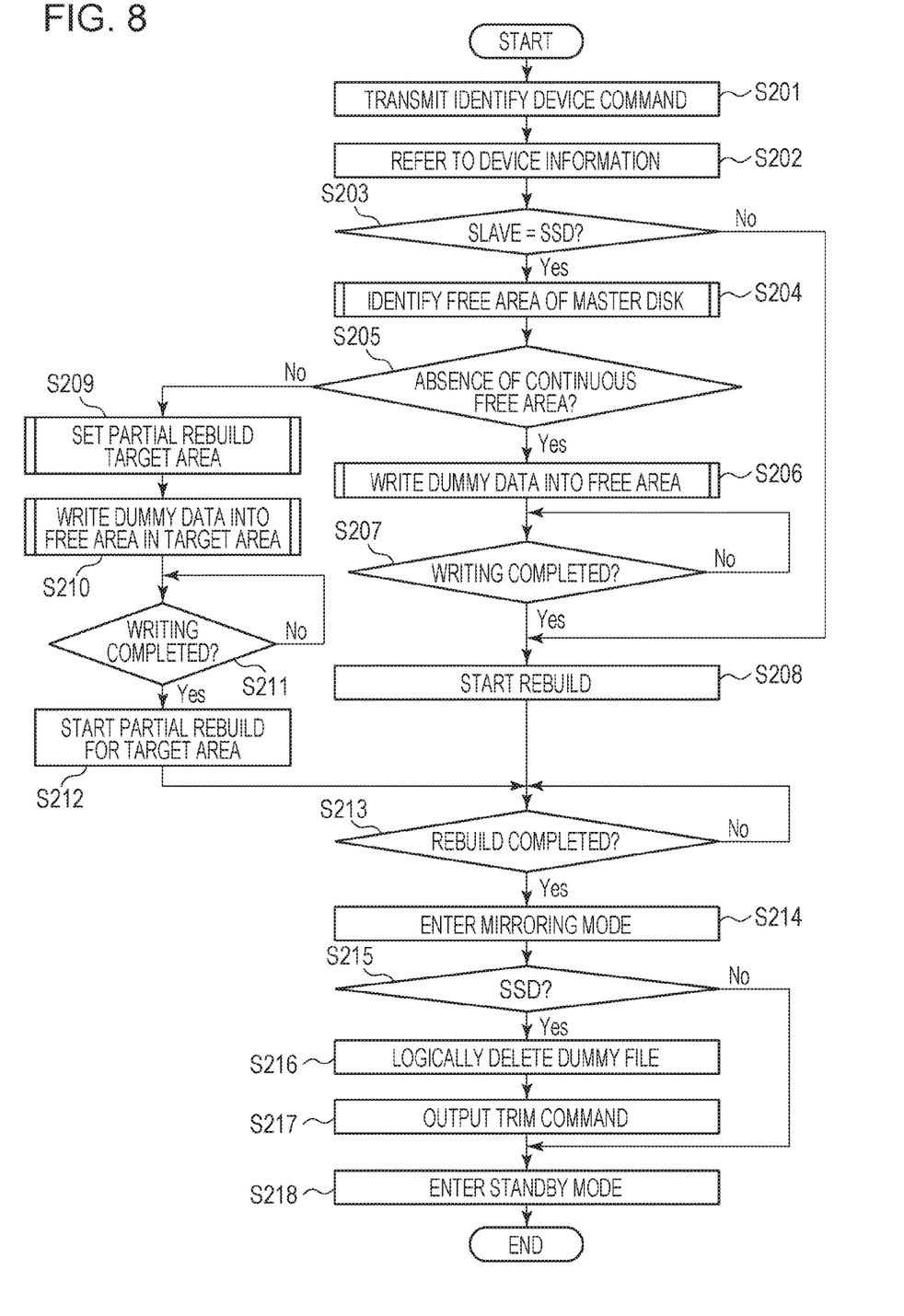
FIG. 8 is a flowchart illustrating storage device rebuild control.

FIGS. 7A to 7D are schematic illustration of state transition of the storage devices, and FIG. 8 is a flowchart of the storage device rebuild control.

The processing from step S201 to step S203 is the same as that from step S101 to step S103 in FIG. 4. Accordingly, description of the processing is not repeated.

Figure 9:
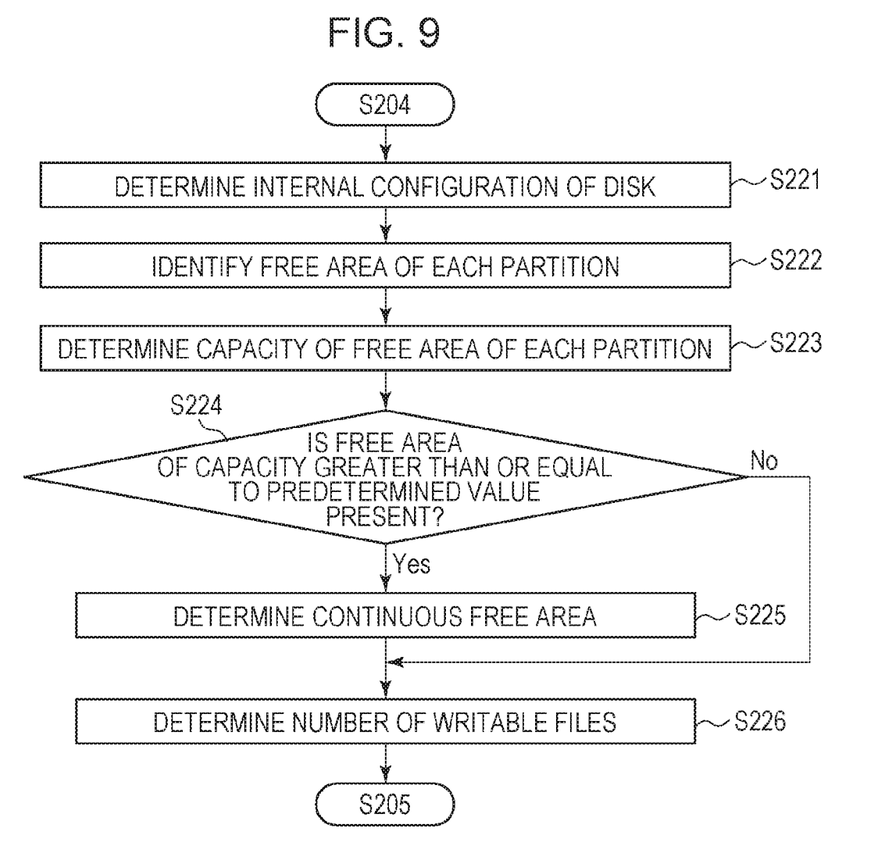
FIG. 9 is a flowchart illustrating a sequence of free area determination.

In the rebuild control performed in step S204, the processing proceeds to a sequence of determination of a free area of an SSD serving as the storage device 414. According to the present exemplary embodiment, detection of a continuous free area is added to the free area determination sequence according to the first exemplary embodiment. The free area determination sequence according to the present exemplary embodiment is illustrated in FIG. 9. Note that because the processing in step S221 and step S222 is the same as that in step S121 and step S122, description of the processing is not repeated.

In step S223, the CPU 401 identifies the capacity of a free area in each of the investigated partitions and selects a partition having a free area of a size greater than a predetermined value. Note that to identify the free area in each partition, the size of a free area is calculated by using the free count in the super block included in the FS management information of the partition, as in the first exemplary embodiment.

In step S224, if the partition does not have a free area having a size greater than or equal to the predetermined value, the processing proceeds to step S226. Step S226 is described below. However, the partition has a free area having a size greater than or equal to the predetermined value, the processing proceeds to step S225.

In step S225, the CPU 401 refers to the FS management information and determines the capacity and the logical address of a continuous free area in the selected partition. More specifically, the CPU 401 refers to the position and the extent (the data size) of a file located in the partition in the Mode information about each partition. The CPU 401 determines the allocation distribution of the files on the basis of the referenced information and calculates the position, range, and size of the logical address of the continuous free area.

Because the processing in step S226 is the same as that in step S123, description of step S226 is not repeated. After step S226 is completed, the processing proceeds to step S205.

In step S205, if a continuous free area having a capacity (the capacity determined in step S225) greater than or equal to the predetermined value is not present, the processing proceeds to step S206. Note that the predetermined value of the size of free area may be any value. According to the present exemplary embodiment, the predetermined value is twice the maximum size of the dummy data file, for example.

Step S206 corresponds to step S105. In step S206, a dummy data file writing sequence for normal rebuild is performed. The detailed description of the dummy data file writing sequence is not repeated. In addition, step S207 and step S208 correspond to step S106 and step S107, respectively. Accordingly, the detailed description of step S207 and step S208 is not repeated. After step S107 is completed, the processing proceeds to step S213.

Referring back to step S205, if a continuous free area having a capacity (the capacity determined in step S225) greater than or equal to the predetermined value is present, the processing proceeds to step S209.

Figure 10:
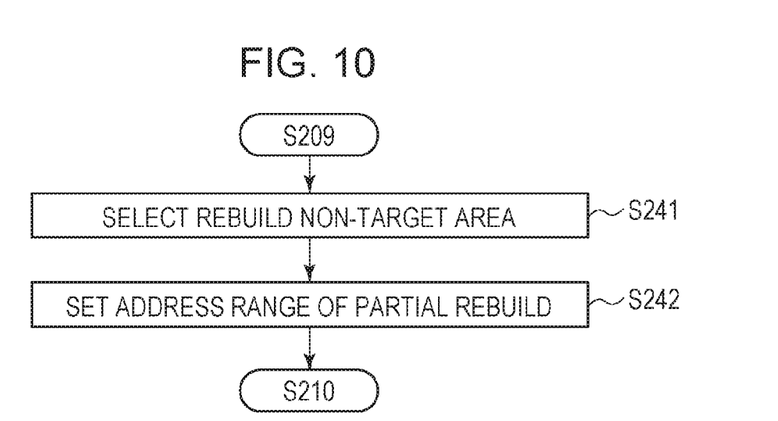
FIG. 10 is a flowchart of the processing for setting a partial rebuild target area.

In step S209, the processing proceeds to a partial rebuild target area setting sequence illustrated in FIG. 10. In step S241, the CPU 401 selects continuous free areas each having a size (the size determined in step S225) greater than or equal to the predetermined value in each partition and sets each of the continuous free areas as a rebuild non-target area. More specifically, the beginning address to the end address of the continuous free area are selected.

At this time, if the upper limit value is defined in terms of the number of areas that can be set for partial rebuild due to the specification limitation of the mirroring control unit 413, the CPU 401 selects, from among the selected continuous free areas, the areas equal in number to the value obtained by subtracting one from the upper limit value in descending order of the capacity of the areas as rebuild non-target areas. For example, if a limit value for the number of areas that can be set for partial rebuild is 3, the number of rebuild non-target areas is 2. Accordingly, two areas having the top two capacities are further selected from among the selected continuous free areas.

In step S242, the CPU 401 sets a partial rebuild address range in the mirroring control unit on the basis of the address information of the selected rebuild non-target area. After step S242 is completed, the processing proceeds to step S210.

In step S210, the processing performed by the CPU 401 proceeds to a sequence of writing dummy file data into the free area in the rebuild target area. A sequence of writing a dummy data file into a free area in the rebuild target area is described with reference to the process flow illustrated in FIG. 11.

Figure 11:
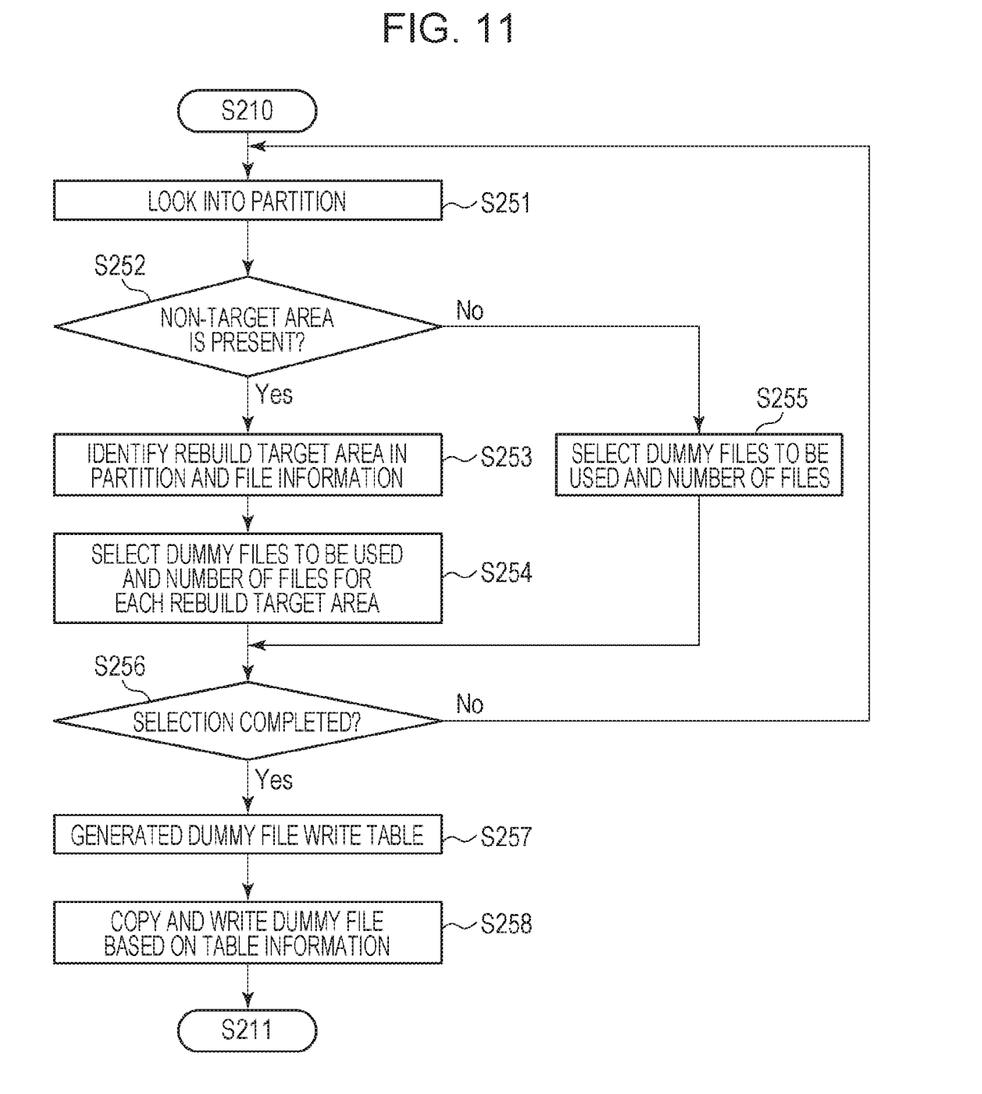
FIG. 11 is a flowchart illustrating the sequence of processes of writing a dummy data file into a free area of a rebuild target area.
Figure 12:
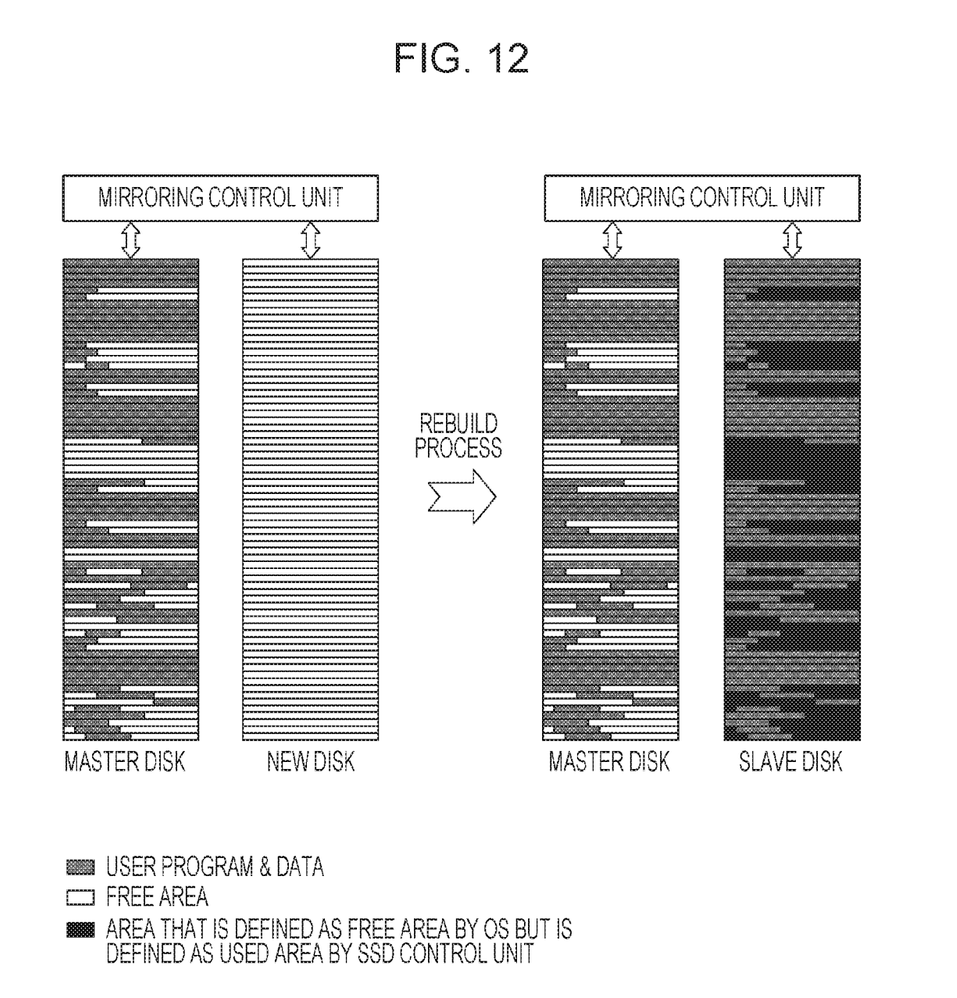
FIG. 12 is a schematic illustration of state transition of an existing storage device.

In step S251, the CPU 401 sequentially determines whether a rebuild non-target area is located in each of the partitions, starting at the beginning of the logical address of the SSD.

If, in step S252, any rebuild non-target area is not included in the selected partition, the processing proceeds to step S255, where the CPU 401 selects the sizes of the dummy data files to be used and the number of the dummy data files in accordance with the free area of the partition. After step S255 is completed, the processing proceeds to step S256. Description of step S256 is provided later. Referring back to step S252, this description continues.

However, if, in step S252, a rebuild non-target area is included in the determined partition, the process in step S253 is performed.

In step S253, the CPU 401 identifies the capacity and address information of the free area in the rebuild target area in the partition from the storage address and data size of the file located in the partition and the address range of the rebuild non-target area.

In step S254, the CPU 401 selects the sizes of the dummy data files to be used and the number of the dummy data files such that the sizes and the number match the free area in the rebuild target area of the partition acquired in step S253.

After selection of dummy data files for all the partitions is completed in step S256, a write table for managing the sizes and the number of dummy data files set for each partition is generated in step S257.

In step S258, the CPU 401 writes the dummy data files to each partition in accordance with the dummy data file write table generated in step S257. If, in step S211, the CPU 401 determines that all the dummy data files have been written, the free area in the rebuild target area of the storage device 414 serving as the master storage is filled with the dummy data files, as illustrated in FIG. 7A. After step S211 is completed, the processing proceeds to step S212.

In step S212, the mirroring control unit 413 reads data in the logical address range set in step S208 from the storage device 414 and starts partial rebuild control for copying the data into the storage device 415 at the address the same as that in the storage device 414.

In step S213, the CPU 401 determines whether the rebuild control is completed. If the rebuild control is completed, the master storage and the slave storage have exactly the same state, as illustrated in FIG. 7B. Note that the process in step S213 is repeatedly performed until the rebuild control is completed.

In step S214, the CPU 401 causes the mirroring control unit 413 to enter a mirroring control mode. If, in step S215, it is determined that the storage device 415 is not an SSD, the processing proceeds to step S218. The process performed in step S218 is described later.

However, if, in step S215, it is determined that the storage device 415 is an SSD, the processing proceeds to step S216, where the CPU 401 logically deletes all dummy data files. Through the processing, as illustrated in FIG. 7C, the areas of the dummy data files in the master storage and the slave storage turn into data area defined as area including data unnecessary by the management information used by the OS.

In step S217, the CPU 401 transmits a Trim command to the SSD.

Upon receiving the Trim command, the SSD performs a delete process of the unnecessary data in the areas defined by the management information used by the OS. As a result, as illustrated in FIG. 7D, the state of the master storage before the rebuild process is exactly reproduced in the slave storage. Note that if both the storage devices 414 and 415 are SSDs, a Trim command is transmitted to both. However, if the storage device 414 serving as the master storage is an HDD, the Trim command is transmitted only to the storage device 415.

Step S218 corresponds to step S113. In step S218, the storage device 414 and the storage device 415 enter the standby mode.

Even in the configuration of the present exemplary embodiment, the following phenomenon that significantly decreases the write performance can be prevented: if rebuild control is performed on the basis of a master storage with free capacity, all of the free areas appear to be used areas from the viewpoint of the SSD control unit of the slave storage.

Furthermore, according to the configuration of the present exemplary embodiment, a continuous free area of a predetermined value or greater is detected as a rebuild non-target area, a dummy data file is written only into the target area, and only the target area is partially rebuilt. In this manner, the processing time required for rebuild can be reduced.

While the present disclosure has been described with reference to the exemplary embodiments, the present disclosure is not limited to these embodiments. It is intended to embrace various embodiments without departing from the scope of the disclosure.

Note that according to the first and second exemplary embodiments, by using "FF" (ALL "1"s) data as the data used for the dummy data file, it is possible to reduce consumption of the substantial device life of a flash memory.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2018-247848 filed Dec. 28, 2018, which is hereby incorporated by reference herein in its entirety.

What is claimed is:

1. An information processing apparatus comprising:
a main storage that is a nonvolatile semiconductor memory;
a replica storage that is a nonvolatile semiconductor memory;
a first controller configured to determine a free storage area of the main storage and provide an instruction to write, into the determined free storage area of the main storage, data that changes the free storage area to a used area; and
a second controller configured to control writing into the main storage and the replica storage,
wherein the first controller outputs an instruction to the second controller to write the data into the main storage,
wherein the second controller writes the data into an entire free storage area of the main storage in accordance with the instruction to write the data, performs rebuild control to write the data written into the main storage and stored therein and all other data into the replica storage, and, in response to completion of the rebuild, performs mirroring control to mirror the main storage and the replica storage, and
wherein the first controller outputs an instruction to the second controller to perform logical delete of the data written into the entire free storage area based on the second controller performing the mirroring control.

2. The information processing apparatus according to claim 1.

3. The information processing apparatus according to claim 1, wherein the first controller acquires, via the second controller, storage information from at least one of the main storage and the replica storage, and determines the free area on a basis of the acquired storage information.

4. The information processing apparatus according to claim 3, wherein the second controller acquires the storage information on a basis of startup of the information processing apparatus.

5. The information processing apparatus according to claim 3, wherein the second controller starts the rebuild control on a basis of the storage information acquired by the first controller.

6. The information processing apparatus according to claim 1,
wherein the first controller determines the size of the free area in the storage area, and
selects a size of the data on a basis of the determined size of the free area.

7. The information processing apparatus according to claim 1, further comprising:
a storage unit including a plurality of types of data having predetermined different data sizes.

8. The information processing apparatus according to claim 1, wherein the data is data consisting of all High level.

9. The information processing apparatus according to claim 1, wherein the main storage and the replica storage are solid-state drives (SSDs).

10. A method for controlling an information processing apparatus including a main storage that is a nonvolatile semiconductor memory and a replica storage that is a nonvolatile semiconductor memory, a first controller configured to determine a free storage area of the main storage, a second controller configured to control writing into the main storage and the replica storage, the method comprising:
outputting, by the first controller, an instruction to the second controller, to write into the determined free storage area of the main storage, data that changes the free storage area to a used area;
writing, by the second controller, the data into an entire free storage area of the main storage in accordance with the instruction to write the data;
rebuilding, by the second controller, the replica storage on a basis of the main storage;
performing, by the second controller upon completion of the rebuilding, mirroring control to mirror the main storage and the replica storage; and
outputting, by the first controller, an instruction to the second controller to perform logical delete of the data written into the entire free storage area.

* * * * *